(12) United States Patent
Berther et al.

(10) Patent No.: US 10,671,045 B2
(45) Date of Patent: Jun. 2, 2020

(54) POSITIONING DEVICE OF A PROCESSING MODULE OF A CABLE PROCESSING MACHINE

(71) Applicant: KOMAX HOLDING AG, Dierikon (CH)

(72) Inventors: Adrian Berther, Hagendorn (CH); Luca Meier, Aesch (CH)

(73) Assignee: KOMAX HOLDING AG, Dierikon (CH)

( * ) Notice: Subject to any disclaimer, the term of this patent is extended or adjusted under 35 U.S.C. 154(b) by 280 days.

(21) Appl. No.: 15/651,524

(22) Filed: Jul. 17, 2017

(65) Prior Publication Data
US 2018/0017953 A1 Jan. 18, 2018

(30) Foreign Application Priority Data
Jul. 18, 2016 (EP) ..................................... 16179951

(51) Int. Cl.
*G05B 19/19* (2006.01)
*B25J 9/02* (2006.01)
*F16H 25/22* (2006.01)
*H01R 43/04* (2006.01)
(Continued)

(52) U.S. Cl.
CPC .............. *G05B 19/19* (2013.01); *B25J 9/023* (2013.01); *F16H 25/2204* (2013.01); *H01R 43/048* (2013.01); *H01R 43/28* (2013.01)

(58) Field of Classification Search
CPC ........ G05B 19/19; B25J 9/023; H01R 43/048; H01R 43/28; F16H 25/2204
See application file for complete search history.

(56) References Cited

U.S. PATENT DOCUMENTS

| | | | | |
|---|---|---|---|---|
| 4,666,367 A | * | 5/1987 | Sticht | ..................... B23P 19/02 414/751.1 |
| 5,709,025 A | * | 1/1998 | Wuyts | .................. G01R 31/023 29/33 M |

(Continued)

FOREIGN PATENT DOCUMENTS

| | | | |
|---|---|---|---|
| EP | 1 032 095 A2 | 8/2000 | |
| EP | 1351349 A1 | * 10/2003 | ........... H01R 43/048 |

OTHER PUBLICATIONS

International European Search Report dated Jan. 30, 2017. EP 16 17 9951.

*Primary Examiner* — Patrick Cicchino
(74) *Attorney, Agent, or Firm* — Sughrue Mion, PLLC (57) ABSTRACT

A positioning device (1) of a processing module of a cable processing machine for finishing a cable. The positioning device (1) includes a first displacing device (10) for displacing the processing module relative to the cable to be processed along a first, in particular horizontal axis (x) transversely, preferably perpendicularly to the longitudinal axis (L) of the cable to be processed and a second displacing device (20) for displacing the processing module relative to the cable to be processed along a second, in particular vertical axis (z) transversely, preferably perpendicularly to the longitudinal axis (L) of the cable to be processed and transversely, preferably perpendicular to the first axis (x). A processing module and a cable processing machine having at least one such positioning device (1).

14 Claims, 5 Drawing Sheets

(51) Int. Cl.
*H01R 43/28* (2006.01)
*H01R 43/048* (2006.01)

(56) References Cited

U.S. PATENT DOCUMENTS 6,289,944 B1    9/2001   Frommenwiler
8,365,632 B2 *   2/2013   Chen ........................ B25J 9/023
                                                             74/490.01

* cited by examiner

POSITIONING DEVICE OF A PROCESSING MODULE OF A CABLE PROCESSING MACHINE

The invention relates to a positioning device of a processing module of a cable processing machine, which is used for finishing cables, in particular cable ends. The invention further relates to a processing module and a cable processing machine with at least one such positioning device.

Cable processing machines for finishing cables, in particular cable ends in the sense of the present invention typically have several processing modules to which the cable to be processed is fed by a pivoting-out and linear movement of a gripper arm, for example to a crimp press, which is used for crimping a plug connection to the stripped end of an electrical connecting cable. Such a cable processing machine is known, for example from EP 1 447 888 B1. Whereas many standard cables can be processed with a maximum of two processing stations per cable end or pivot arm, for cables with a more complex structure such as, for example, coaxial cables, significantly more processing steps need to be carried out. Since the number of processing stations within a cable processing machine is usually restricted for space reasons, and the processing modules sometimes have complex drives, special tools have been developed for the processing modules with which several process steps can be implemented. Thus, for example, tools are used which can execute a total of three process steps for the finishing of a coaxial cable, possibly (1) the crimping of a support sleeve onto the shield of a dismantled coaxial cable, (2) the laying of the shield over the support sleeve and (3) the crimping of a contact part onto the inner conductor of the coaxial cable to be stripped. This tool has the property that for each of the three process steps (1)-(3) a different positioning of the cable relative to the processing module is required because the processing module has different processing positions or processing stations for each of the process steps. Thus, it can possibly be provided that (1) the crimping of the support sleeve onto the shield and (2) the laying of the shield is performed at two processing positions spaced apart vertically from one another and that after (2) the laying of the shield, the cable is additionally pivoted with the aid of the pivoting gripper arm for (3) the crimping of a contact part onto the inner conductor in a horizontal plane to a second crimping device. Usually the different processing positions are laid out on a uniform orientation of the longitudinal axis of the cable to be processed and arranged accordingly. Thus, in the present example all the tool stations for process step (1)-(3) are aligned parallel to a specific position of the cable longitudinal axis. The pivoting of the cable after the laying of the shield, however then results for process step (3) in a change in the angular position of the cable and therefore a positional deviation of the cable longitudinal axis from the actually provided optimal position of the cable relative to the second crimping device. A similar problem exists in view of process steps (1) and (2) for the cable position in the vertical direction.

Hitherto usual cable processing modules, in particular crimping presses, usually have a height adjustment to be actuated by hand whereby the press can be raised and lowered. This adjustment is used primarily to compensate for the different anvil heights which occur when using different crimping tools. However, the height adjustment does not allow the press position to be adjusted during processing.

As described, in the tool according to the above example, the processing positions for the process steps (1) and (2) lie on different horizontal planes. In addition, the cable must be lowered in both crimping processes (1) and (3) as described for example in EP 2 775 573 B1. Notwithstanding the pivoting problems, the processing tool in the present example could be placed for this purpose in the cable processing machine so that the cable would lie in the plane of process step (2) and that the two crimp positions (1) and (3) would be reached by different lowering movements of the cable. However, this can only be achieved technically at great expense and can also result in angular error depending on the design of the machine. Alternatively the partial problem of the vertical positioning could be solved with a program-controlled lowerable cable gripper as described in EP 2 174 390 B1. However, such a device is also technically very complex.

In order to solve the problem of the angular deviation during pivoting, the tool could be designed so that the second crimping device is arranged obliquely—adapted to the pivoted cable position. However, such a design would again be technically very complex and would only be suitable for a specific pivoting radius of the machine. Alternatively, the processing could be carried out on a transfer machine, as described in EP 1 073 163 B1, by means of which the cable could be positioned freely with respect to the tool but which is substantially more expensive than other cable processing machines.

The object of the present invention is therefore to solve the above-described problem of cable positioning in processing modules of cable processing machines, in particular in those processing modules having several processing positions.

This object is solved by a positioning device according to claim 1 and a processing module according to claim 12 and a cable processing machine according to claim 13. Advantageous embodiments of the invention are the subject matter of the dependent claims.

The positioning device according to the invention is intended for the positioning of a processing module of a cable processing machine and is characterized in that it has at least one first displacing device for displacing the processing module relative to the cable to be processed along a first axis transversely to the longitudinal axis of the cable to be processed and further comprises a second displacing device for displacing the processing module relative to the cable to be processed along a second axis transversely to the longitudinal axis of the cable to be processed and transversely to the first axis.

Preferably the first axis and/or the second axis are aligned perpendicular to the longitudinal axis of the cable to be processed and preferably also perpendicular relative to one another. In particular, it can be provided that the first axis extends horizontally and the second axis extends vertically. In this preferred embodiment, the positioning device allows a displacement of the processing module in a plane perpendicular to the longitudinal axis of the cable to be processed.

As a result of the two displacing devices transverse to the longitudinal axis of the cable, it is achieved that the processing module can be arbitrarily moved relative to the cable to be processed into respectively different processing positions along two axes so that now the cable no longer needs to be positioned relative to a positionally fixed processing module transversely to its longitudinal axis—hitherto in the prior art. On the contrary, the cable can maintain a constant orientation/position transversely to its longitudinal axis and optionally only needs to be displaced along its longitudinal axis for specific processing processes—if at all. As a result, in particular the initially described problem of angular deviation is eliminated since a pivoting of the cable relative to the processing module can be dispensed with. In addition, all the processing positions or tools of the processing module can advantageously be aligned in a manner which is technically easy to implement parallel to the constant orientation/position of the cable longitudinal axis.

Preferably the positioning device is configured in such a manner that the displacement movement along the first or the second axis is oriented along a direction of movement of a tool of a processing module which can be positioned with the aid of the positioning device relative to the cable to be processed. Thus, it can be provided for example that with the positioning device according to the invention, a processing module with a crimping tool can be positioned, wherein the crimping tool comprises a crimping anvil and a crimping press which can be moved for example in the direction of the crimping anvil, for example in the vertical direction. In this case, according to a preferred embodiment of the positioning device according to the invention, it can be provided that possibly the second axis of the second displacing device is oriented parallel to the direction of movement of the crimping press. As a result, a significantly improved crimping process can be achieved since the initially described travel path parallel to the direction of movement of the crimping press during lowering of a cable gripper which holds the cable to be processed can now be severely reduced as a result of the positionability of the processing module relative to the cable which is now possible. If the second axis or direction of movement of the crimping press is vertically oriented, a height adjustability of the processing module can be advantageously achieved by means of the second displacing device of the positioning device.

Naturally it is also feasible that in addition to the first and second displacing device, the positioning device additionally has another, at least a third, displacing device for displacing the processing module relative to the cable along a third axis transversely to the first and second axis. Preferably the third axis extends parallel to the longitudinal axis of the cable to be processed. By this means in particular a variable feed of the tool or tools of the processing module to different longitudinal sections of the cable to be processed can be achieved.

According to a further advantageous embodiment of the invention, it can be provided that the first displacing device is arranged in the moving system of the second displacing device, wherein the processing module is configured to be arranged in the moving system of the first displacing device. Conversely it is also feasible that the second displacing device is arranged in the moving system of the first displacing device, wherein the processing module can be arranged in the moving system of the second displacing device. In both these cases, the first and the second displacing device are each coupled to one another. Thus, for example, it can be provided that the first displacing device is configured for displacement along a horizontal axis and the second displacing device is arranged thereon, the second displacing device being configured for height adjustment along a vertical. As a result, a displacement along the first axis therefore always brings about a horizontal movement of the second displacing device. Alternatively however it is also feasible that the first displacing device and the second displacing device are decoupled from one another in relation to their moving systems. Such a decoupled first and second displacing device is characterized in particular by a reduced moving mass which increases the attainable precision and speed of the displacing devices.

According to a particularly preferred embodiment of the invention, the first displacing device and/or the second displacing device can have at least one, in particular rectilinear, linear guide device. It is feasible for example that the rectilinear guide device comprises at least one ball bearing, cross roller bearing, circulating-bearing or swallowtail guide.

According to a further advantageous embodiment of the invention, the first or the second displacing device can have at least one lifting device. Preferably the lifting device comprises at least one lifting gear, in particular at least one lifting gear with at least one lifting rod. Preferably the lifting gear is configured to be self-retaining, possibly as a worm gear in order to prevent the weight of the processing module bringing about an undesired displacement in the vertical direction. In order to guide the lifting movement of the lifting device, the lifting device can further comprise at least one guide rod or guide column guided displaceably with a linear guide socket. Preferably a plurality of such guide columns or guide rods are provided, which are each guided displaceably in a linear guide socket. The at least one guide rod or guide column can for example have a round cross-section. Alternatively the guide rod or guide column can also have a polyhedral, in particular triangular or quadrangular cross-section. The cross-section of the linear guide socket is configured in a corresponding complementary manner. Advantageously a prevention of rotation of the moving system with respect to the stationary system of the lifting device is achieved by means of a corresponding configuration of the cross-section of the guide column/guide rod and the complementarily configured cross-section of the linear guide socket. Thus, for example, the guide rod/guide column—and, in a corresponding complementary manner, the linear guide socket—can have a polyhedral cross-section or a cross-section which is flattened in sections, in order to simultaneously prevent rotation of the lifting device against an undesired twisting about the axis of displacement of the twisting device in addition to guidance along the axis of displacement of the lifting device.

According to a further advantageous configuration of the invention, the first displacing device and/or the second displacing device can comprise a spindle gear, in particular a ball-type linear drive or a threaded roller drive. Additionally or alternatively, the first and/or the second displacing device can also comprise a toothed belt gear.

The first and the second displacing device in the sense of the present invention are in particular actuator-driven preferably mechanically or electromechanically. "Actuator-driven" in the sense of the present invention means that the first and the second displacing device each have at least one actuator device which converts signals, for example, coming from a controller into a mechanical movement. For producing a corresponding displacement movement, the first and/or the second displacing device can in particular have a pneumatic, magnetic or electric-motor actuator device. Preferably linear actuator devices or rotary actuator devices come into consideration. For example piezo-actuators, linear motors, stepped motors (stepper motors), servo motors or pneumatic cylinders are feasible.

According to a further preferred embodiment of the invention, the positioning device comprises a base element, in particular a base plate, on which the first and the second displacing device are arranged. This ensures the stability and reliability of the positioning device in a manner which is particularly simple to achieve.

Furthermore, according to an advantageous embodiment of the invention, it can be provided that the positioning device has a receiving element, in particular a receiving plate, for receiving the processing module, which receiving element can be displaced by means of the first and the second displacing device along the first and second axis relative to the cable to be processed.

According to a further advantageous embodiment of the invention, the displacement movements of the entire positioning device are program-controlled. For this purpose it can be provided that the positioning device has a control device for controlling the displacement movements of the first and second displacing device. This control device is preferably operatively connected or can be operatively connected to a controller of the processing module and/or of the cable processing machine or is even integrated or can be integrated therein.

The invention further relates to a processing module of a cable processing machine, having at least one positioning device according to the invention. The invention further relates to a cable processing machine comprising at least one processing module having at least one positioning device according to the invention.

Further aims, advantages and possible applications of the present invention are obtained from the following description of an exemplary embodiment of the invention as well as by reference to the appended figures.

Figure 1:
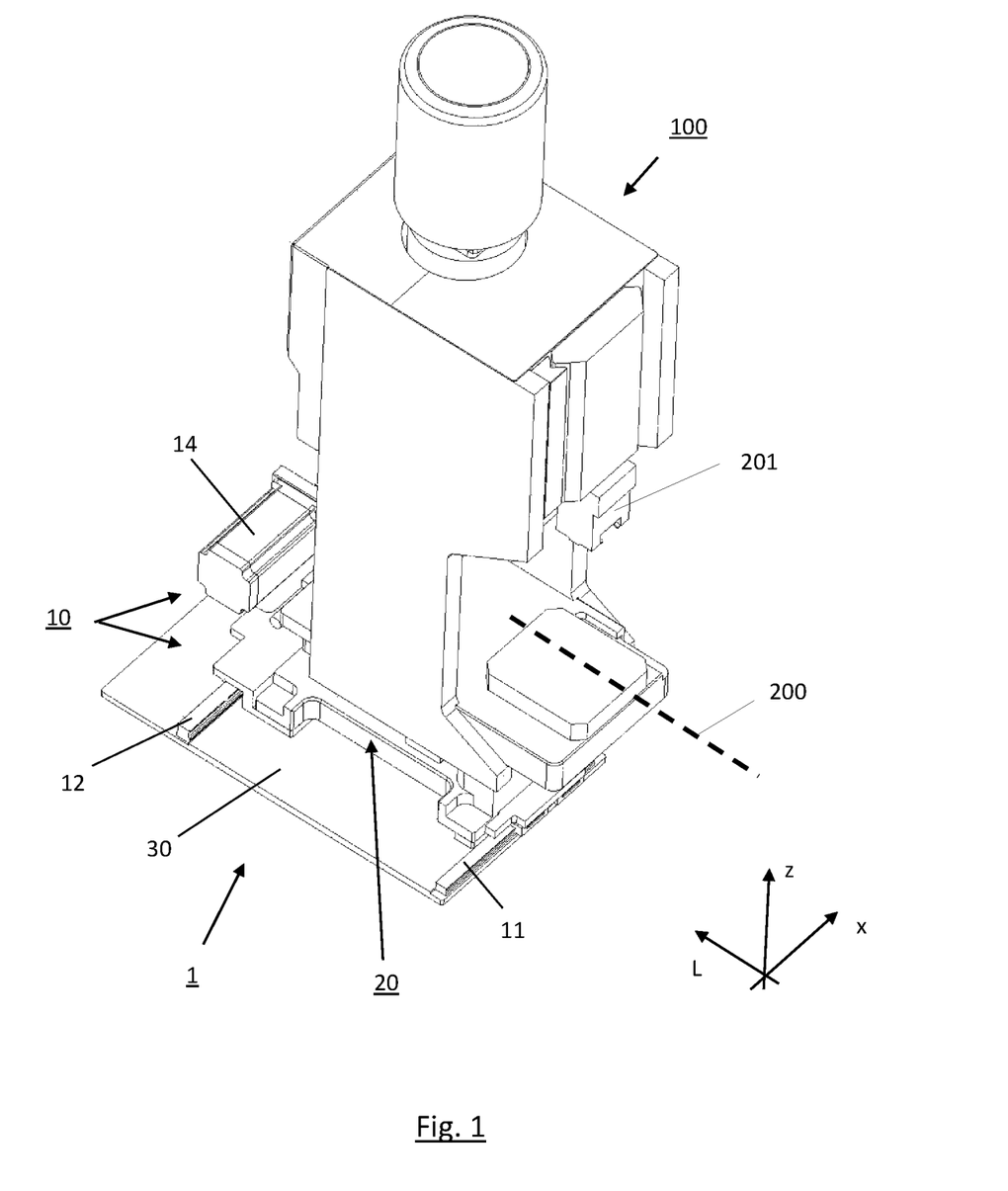
FIG. 1 shows a perspective view of a possible exemplary embodiment of a positioning device according to the invention on which a processing module of a cable processing machine is arranged.
Figure 2:
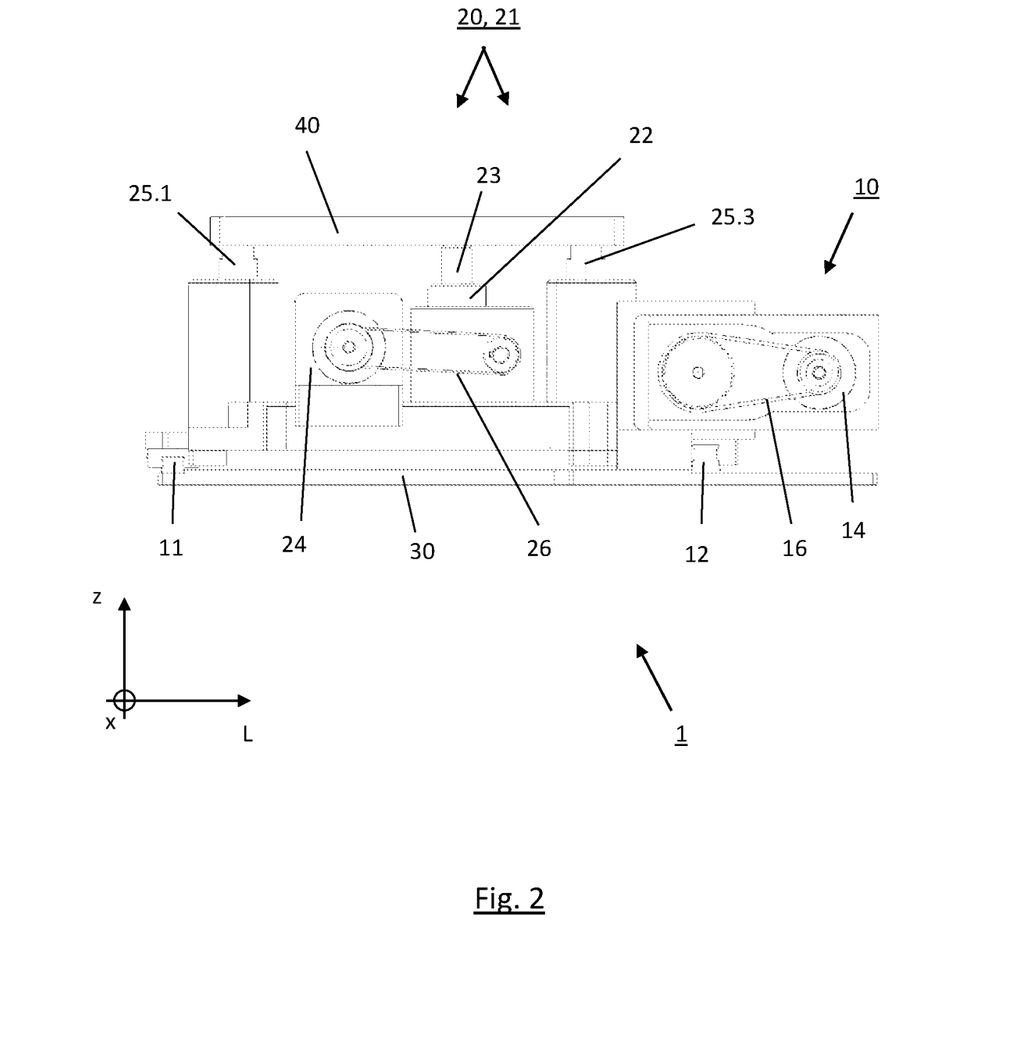
FIG. 2 shows a side view of the positioning device according to FIG. 1 without processing module.
Figure 3:
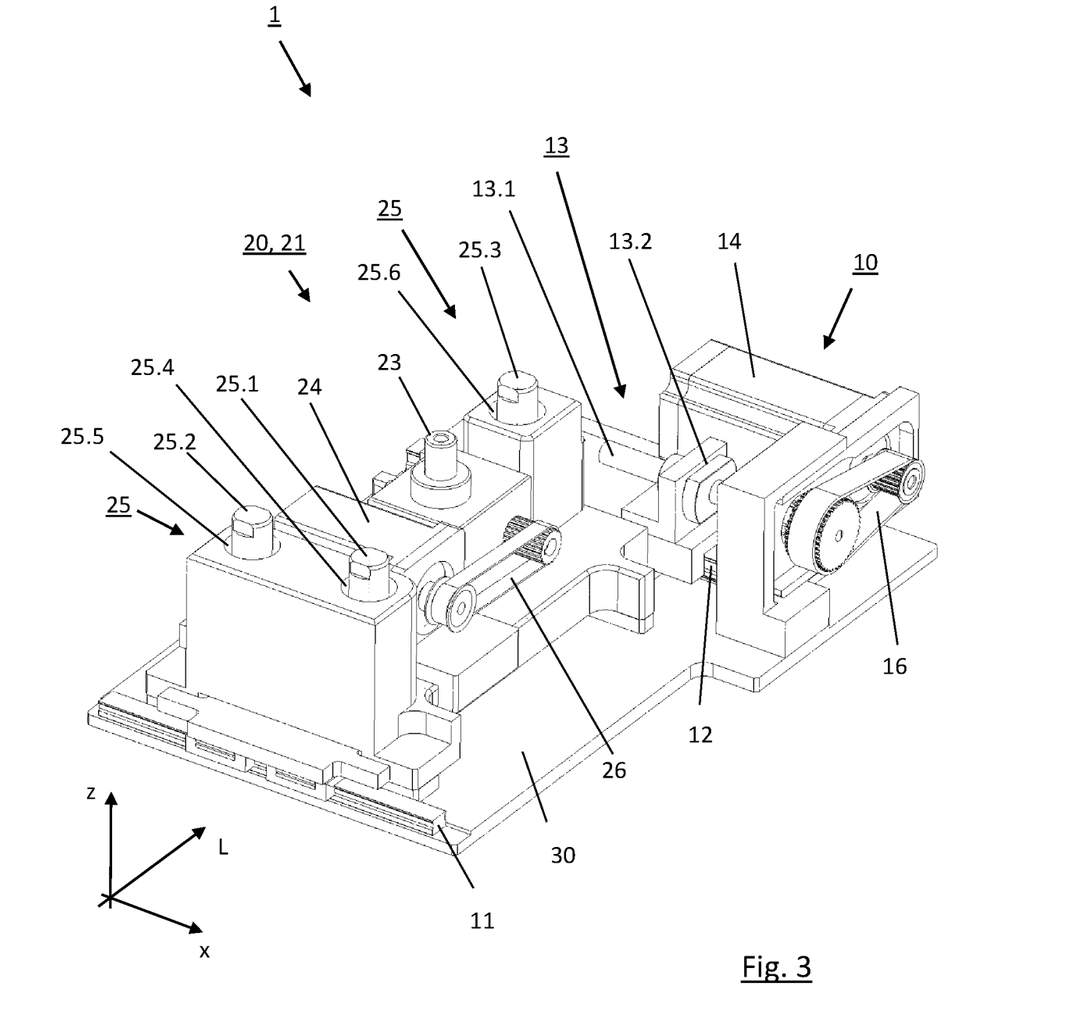
FIG. 3 shows a perspective view of the positioning device according to FIG. 1 without receiving plate and without processing module.

FIGS. 1-3 show a possible exemplary embodiment of a positioning device 1 according to the invention which is used for displacement of a processing module 100 of a cable processing machine (not shown here) relative to a cable 200 to be processed or finished by the processing module 100. The cable 200 to be processed or finished is indicated schematically in FIG. 1 by a dashed line.

According to the invention, the positioning device 1 comprises at least a first displacing device 10 for displacement of the processing module 100 relative to the cable 200 to be processed along a first horizontal axis X perpendicular to the longitudinal axis L of the cable 200 to be processed. Furthermore the positioning device 1 comprises at least a second displacing device 20 for displacement of the processing module 100 relative to the cable 200 to be processed along a second vertical axis Z perpendicular to the longitudinal axis L of the cable 200 and perpendicular to the first axis X. It is thereby achieved that the processing module 100 can be freely positioned relative to the cable 200 to be processed in a plane perpendicular to the longitudinal axis L of the cable 200 in order to bring various processing positions or tools of the processing module (not shown here) close to the cable to be finished so that the cable 200 now no longer needs to be positioned relative to a positionally fixed processing module transverse to its longitudinal axis—as hitherto in the prior art. On the contrary the cable 200 can maintain a constant orientation/position transverse to its longitudinal axis L and optionally only needs to be displaced along its longitudinal axis for certain processing processes—if at all. Naturally it is however possible that the cable 200 can be additionally displaced by means of a gripper device (not shown here) additionally transversely to its longitudinal axis.

In the exemplary embodiment shown in the present case in FIGS. 1-3, the positioning device 1 comprises a base plate 30 on which two linear guides 11, 12 are arranged which run in the direction of the first axis x and form the first displacing device 10. Also located on these two linear guides 11, 12 is a lifting device 21 which is displaceably horizontally along the first axis x by means of the two linear guides 11, 12 and forms the second displacing device 20. The lifting device 21 has a total of three vertical linear guides 25. Each of the three vertical linear guides 25 comprises a guide rod 25.1, 25.2, 25.3 guided displaceably in a linear guide socket 25.4, 25.5, 25.6, which jointly support a receiving plate 40 used to receive the processing module 200 to be positioned.

In order to adjust the height of the receiving plate 40 and therefore the processing module 200 in the vertical direction, the lifting device 21 comprises a self-retaining lifting gear 22, possibly a worm gear, with a lifting rod 23 which is adjustable in the second direction z and which acts on the receiving plate 40 from below.

In order to produce the displacement movements of the first and second displacing device 10, 20, the positioning device 1 has a first and second servo motor 14, 15. The first servo motor 14 is connected via a toothed belt gear 16 to a spindle gear 13. The spindle gear 13 comprises a spindle 13.1 driven rotatably by the first spindle motor 14 and a spindle nut 13.2 which is located in the moving system of the first displacing device 10 and is connected to the lifting device 21 so that a rotational movement of the first servo motor 14 brings about a linear displacement of the first displacing device 10 and therefore of the lifting device 21, the receiving plate 40 and ultimately the processing module 100 along the first axis x. The first servo motor 14, the toothed belt gear 16 and the spindle 13.1 are arranged accordingly on the base plate 30 or connected thereto. The second servo motor 24 is used as lifting motor for the lifting device 21 and is also operatively connected via a toothed belt gear 26 to the lifting gear 22 so that a rotational movement of the lifting motor 24 brings about a vertical up and down movement of the lifting rod 23 and therefore of the receiving plate 40 and the processing module 100 arranged thereon.

The respective displacement or positioning movements of the first and second displacing device 10, 20 are controlled by a controller not shown here as a function of the processing processes to be carried out by the processing module 100. Advantageously the controller is directly operatively connected to the motors 14, 20 of the first and second displacing device 10, 20. In order to regulate the displacement or positioning movements of the first and second displacing device 10, 20 along the first and second axis x, y, position detection means (not shown here) or for each axis at least one position detection device or at least one common position detection device can be additionally provided, which is/are configured to detect the respective position of the first and second displacing device 10, 20 and/or of the processing module 100 along the first or second axis x, y and transmit it to the controller.

Figure 4A:
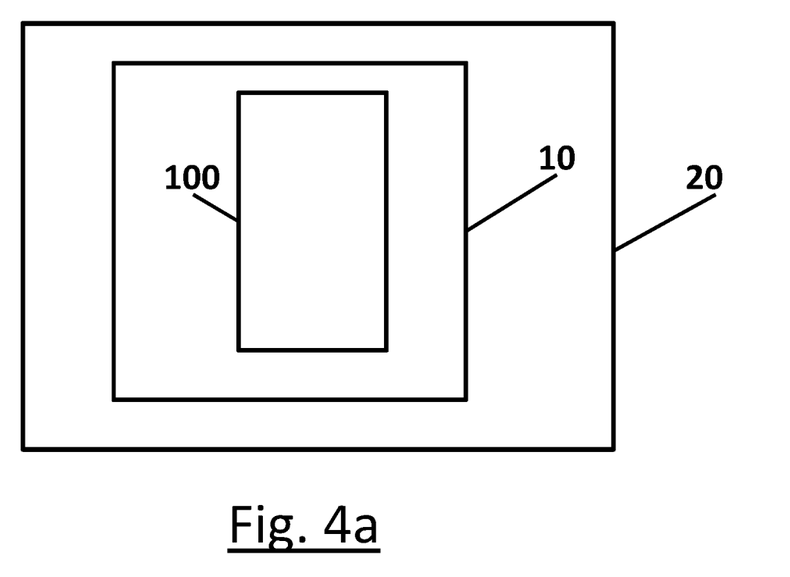
FIGS. 4a to 4c schematically show various configurations of the positioning devices and the processing module in accordance with some embodiments.
Figure 4B:
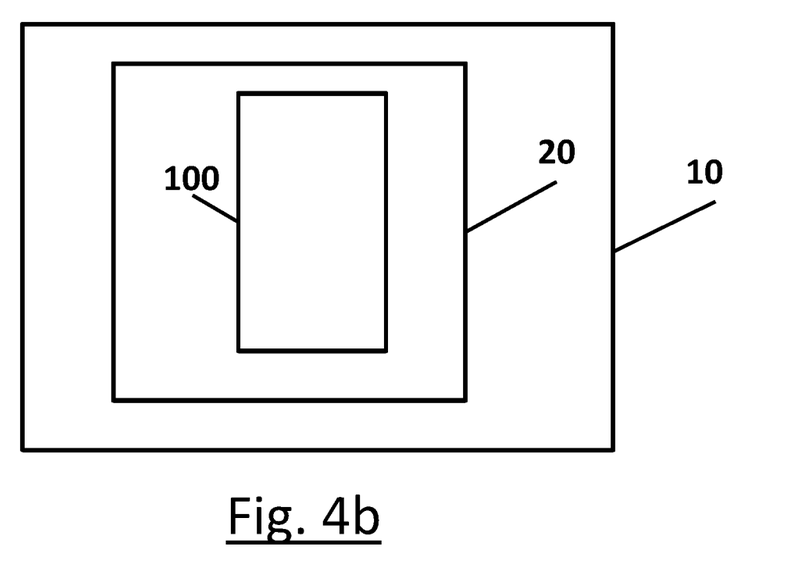
Figure 4C:
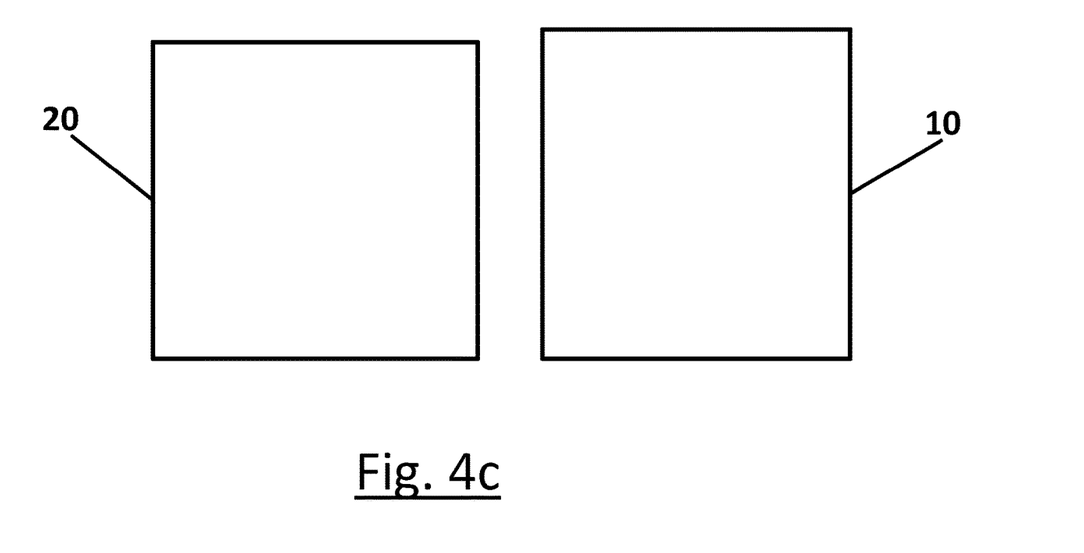

FIGS. 4a to 4c schematically show some configurations for the first displacing device (10), the second displacing device (20) and the processing module (100). The first displacing device (10) can be arranged in the moving system of the second displacing device (20), wherein the processing module (100) can be arranged in the moving system of the first displacing device (10). Optionally, the second displacing device (20) can be arranged in the moving system of the first displacing device (10), wherein the processing module (100) can be arranged in the moving system of the second displacing device (20). Further, the first displacing device (10) and the second displacing device (20) can be decoupled from one another in relation to their moving systems.

The invention claimed is:

1. A cable processing machine, comprising:
    a processing module configured to carry out a finishing operation on a cable, said cable fed to the cable processing machine along a longitudinal axis;
    a positioning device (1) for the processing module (100), comprising:
        a first displacing device (10) configured to displace the processing module (100) relative to the longitudinal axis for carrying out the finishing operation on relative to the cable support and the cable (200) to be processed, said first displacing device configured to displace the processing module along a first, horizontal axis (x) transversely to the longitudinal axis; and
        a second displacing device (20) for displacing the processing module (100) relative to the longitudinal axis for carrying out the finishing operation on the cable to be processed, said second displacing device configured to displace the processing module along a second, vertical axis (z) transversely to the longitudinal axis (L) and transversely to the first axis (x).

2. The cable processing machine according to claim 1, wherein the first displacing device (10) is arranged in the moving system of the second displacing device (20), wherein the processing module (100) can be arranged in the moving system of the first displacing device (10); or that the second displacing device (20) is arranged in the moving system of the first displacing device (10), wherein the processing module (100) can be arranged in the moving system of the second displacing device (20); or that the first displacing device (10) and the second displacing device (20) are decoupled from one another in relation to their moving systems.

3. The cable processing machine according to claim 1, wherein the first displacing device (10) and/or the second displacing device (20) has at least one linear guide device (11, 12, 25), which comprises at least one ball bearing, cross roller bearing, circulating-bearing or swallowtail guide.

4. The cable processing machine (1) according to claim 1 wherein the first displacing device (10) or the second displacing device (20) has at least one lifting device (21).

5. The cable processing machine according to claim 4, wherein the lifting device (21) comprises at least one lifting gear (22), with at least one lifting rod (23).

6. The cable processing machine according to claim 4, wherein the lifting device (21) comprises at least one guide rod or guide column (25.1, 25.2, 25.3) guided displaceably in a linear guide socket (25.4, 25.5, 25.6).

7. The cable processing machine according to claim 1 wherein the first displacing device (10) and/or the second displacing device (20) comprises a spindle gear (13), which is a ball-type linear drive or a threaded roller drive and/or a toothed belt gear (16, 26).

8. The cable processing machine according to claim 1 wherein for producing a displacement movement the first displacing device (10) and/or the second displacing device (20) have a pneumatic, magnetic or electric-motor actuator device (14, 24), which is a linear actuator device or rotary actuator device.

9. The cable processing machine according to claim 1 wherein the positioning device (1) comprises a base element (30), which is a base plate, on which the first and the second displacing device (10, 20) are arranged.

10. The cable processing machine according to claim 1 wherein the positioning device (1) has a receiving element (40), which is a receiving plate, for receiving the processing module (100), the receiving element being configured to be displaced by means of the first and the second displacing device (10, 20) along the first and second axis (x, z) relative to the cable (200) to be processed.

11. The cable processing machine according to claim 1 wherein the positioning device (1) has a control device for controlling the displacement movements of the first and second displacing device (10, 20).

12. The cable processing machine according to claim 1, wherein the first, horizontal axis (x) is perpendicular to the longitudinal axis (L) of the cable (200) to be processed and the second, vertical axis (z) is perpendicular to the longitudinal axis (L) of the cable (200) to be processed and perpendicular to the first axis (x).

13. The cable processing machine according to claim 5, wherein the lifting gear is self-retaining, so as to prevent the weight of the processing module from displacing the processing module downwardly along the vertical axis.

14. The cable processing machine according to claim 8, wherein, the linear actuator device or rotary actuator device is a piezo-actuator, a linear motor, a stepper motor, a servo motor or a pneumatic cylinder.

* * * * *